(12) United States Patent
Takahashi et al.

(10) Patent No.: US 9,758,026 B2
(45) Date of Patent: Sep. 12, 2017

(54) DEFLECTOR STRUCTURE FOR SUNROOF DEVICE

(71) Applicant: YACHIYO INDUSTRY CO., LTD., Saitama (JP)

(72) Inventors: Yuya Takahashi, Tochigi (JP); Keisuke Fujimoto, Tochigi (JP)

(73) Assignee: Yachiyo Industry Co., Ltd., Saitama (JP)

( * ) Notice: Subject to any disclaimer, the term of this patent is extended or adjusted under 35 U.S.C. 154(b) by 0 days.

(21) Appl. No.: 15/316,798

(22) PCT Filed: Apr. 8, 2015

(86) PCT No.: PCT/JP2015/060966
§ 371 (c)(1),
(2) Date: Dec. 6, 2016

(87) PCT Pub. No.: WO2015/186426
PCT Pub. Date: Dec. 10, 2015

(65) Prior Publication Data
US 2017/0182870 A1    Jun. 29, 2017

(30) Foreign Application Priority Data

Jun. 6, 2014  (JP) .................................. 2014-117504

(51) Int. Cl.
*B60J 7/22*       (2006.01)
*B60J 10/82*      (2016.01)
*B60J 7/00*       (2006.01)

(52) U.S. Cl.
CPC ................. *B60J 7/22* (2013.01); *B60J 10/82* (2016.02); *B60J 7/0007* (2013.01); *B60J 7/223* (2013.01); *B60J 7/226* (2013.01)

(58) Field of Classification Search
CPC ........................................................ B60J 7/22
(Continued)

(56) References Cited

U.S. PATENT DOCUMENTS

| 8,662,577 B2 | 3/2014 | Wimmer |
| 2003/0038512 A1 | 2/2003 | Farber et al. |

(Continued)

FOREIGN PATENT DOCUMENTS

| DE | 102008006344 B3 | 4/2009 |
| DE | 102011116109 B3 | 4/2013 |

(Continued)

OTHER PUBLICATIONS

International Search Report by Japanese Patent Office for corresponding PCT/JP2015/060966 application dated Jun. 30, 2015 (2 pages)—Japanese.

(Continued)

*Primary Examiner* — Dennis H Pedder
(74) *Attorney, Agent, or Firm* — Capitol City TechLaw, PLLC; Samuel P. Burkholder

(57) ABSTRACT

A deflector structure for a sunroof device includes: a thinned-cloth member (6) having a lower side connectedly fixed to a front frame (11), the thinned-cloth member being configured to be stretchedly developed to regulate a traveling air while a roof is opened and to be foldedly stored while the roof is closed; and a storage guide member (14) configured to guide folding motion of the thinned-cloth member (6). The storage guide member (14) includes: a front-side first upright wall (15) and a rear-side second upright wall (16) provided upright on the front frame (11) at the rear of a fixation portion of the front frame (11) and the thinned-cloth member (6); and a guide wall (17) formed on an upper holder (7) along a rear surface of an upper portion of the thinned-cloth member stretchedly developed. Thereby, a folded shape of the thinned-cloth member (6) is stabilized.

2 Claims, 5 Drawing Sheets

(58) Field of Classification Search
USPC .......................................................... 296/217
See application file for complete search history.

(56)                References Cited

U.S. PATENT DOCUMENTS

2007/0096509  A1*   5/2007   Johannes Manders .... B60J 7/22
                                                      296/217
2010/0313486  A1    12/2010  Kuribayashi et al.

FOREIGN PATENT DOCUMENTS

| JP | 2-100818 U | 8/1990 |
|----|------------|--------|
| JP | 2013520359 A | 6/2013 |
| WO | 2012052247 A1 | 4/2012 |

OTHER PUBLICATIONS

International Search Report by Japanese Patent Office for corresponding PCT/JP2015/060966 application dated Jun. 30, 2015 (2 pages)—English.

* cited by examiner

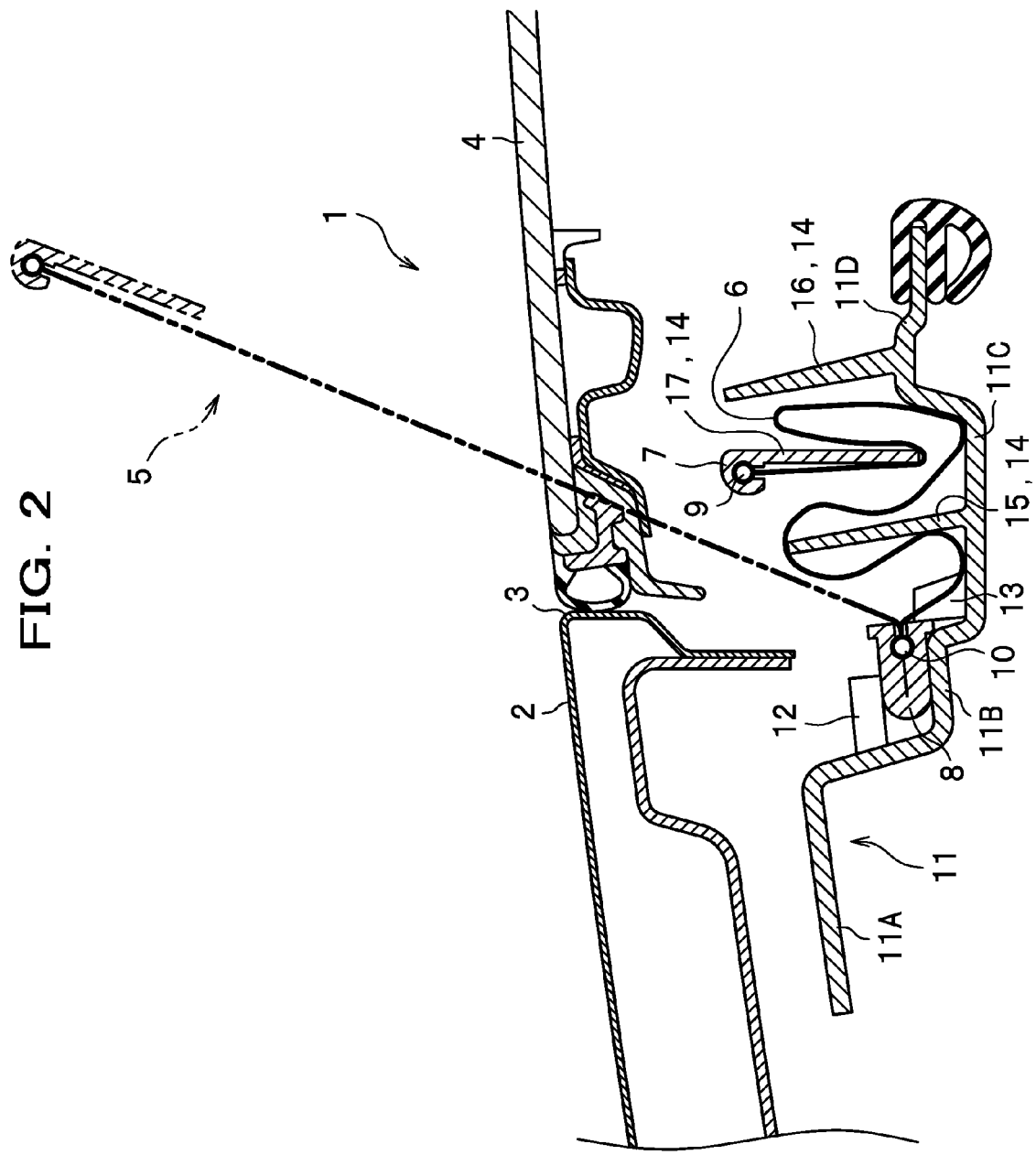

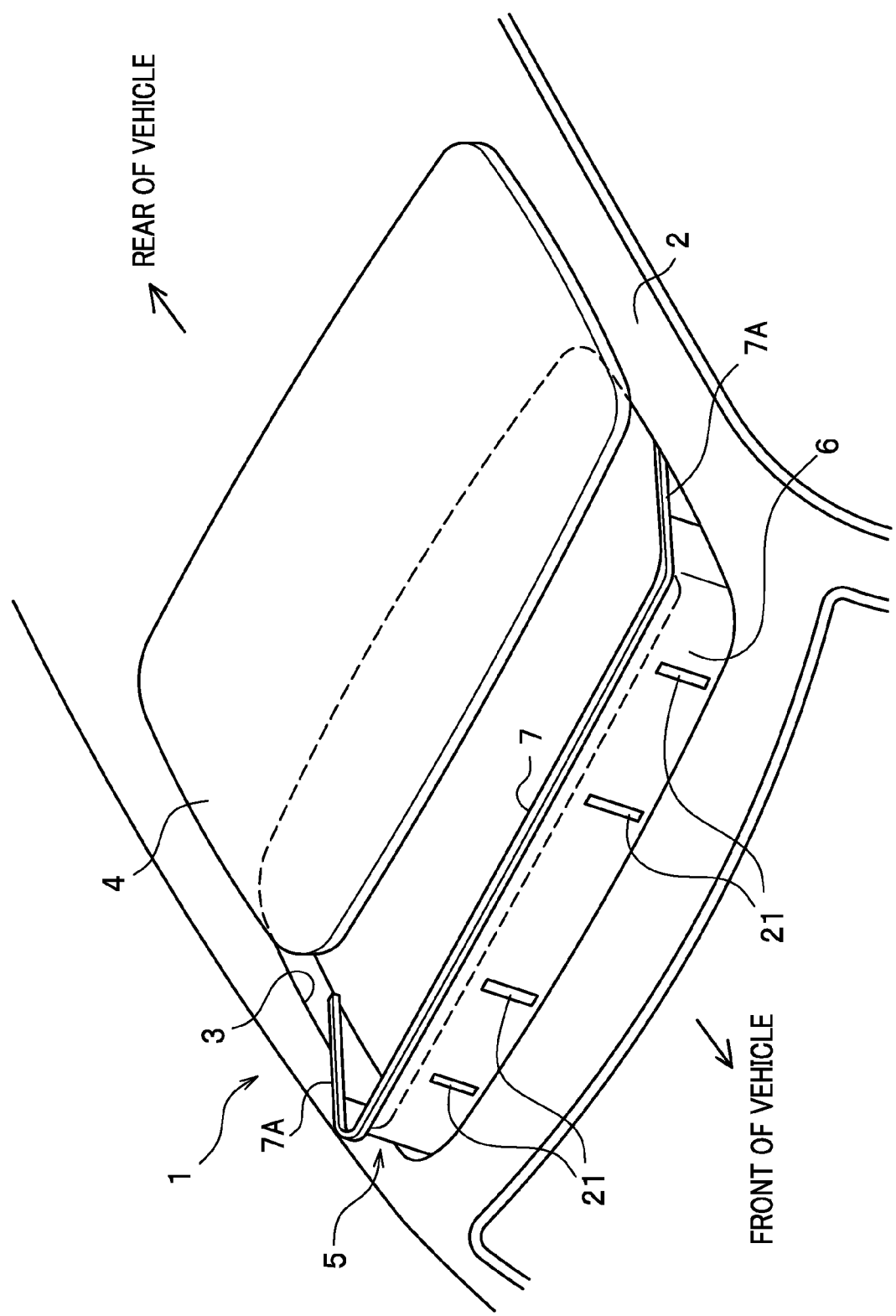

DEFLECTOR STRUCTURE FOR SUNROOF DEVICE

TECHNICAL FIELD

The present invention relates to a deflector structure for a sunroof device.

BACKGROUND ART

A vehicle includes a sunroof device, which is provided with a deflector in order to prevent air flow from flowing into the interior while the vehicle runs with the roof opened. As the conventional example of the deflector a so-called net deflector has been known, which includes a net of a flexible cloth material with fine meshes (for example, see the patent literature 1). In this net deflector, the net, when the roof is opened, is stretchedly developed such that it is provided upright and the developed net regulates a traveling air, and the net is foldedly stored under the roof when the roof is closed.

CITATION LIST

Patent Literature

Patent Literature 1: Patent Application Publication No.: 2013-520359

SUMMARY OF INVENTION

Technical Problem

In the net deflector, the net is a flexible cloth-material, and tends to vary in a folded shape every time the net is stored. Therefore, in some cases, a portion of the folded net can come out of a predetermined storage portion to be exposed to the interior.

The present invention is made to solve such a problem, and, in a deflector of a sunroof device with a structure in which a thinned-cloth member is stretchedly developed for regulation, aims to prevent the thinned-cloth member from being exposed to the interior by stabilizing a folded shape of the thinned-cloth member without enlarging a storage space.

Solution to Problem

To solve the problem, the present invention provides a deflector structure for a sunroof device including: a thinned-cloth member having a lower side connectedly fixed to a front frame, the thinned-cloth member being configured to be stretchedly developed to regulate a traveling air while a roof is opened and be foldedly stored while the roof is closed; and a storage guide member configured to guide folding motion of the thinned-cloth member. The storage guide member includes a front-side first upright wall and a rear-side second upright wall provided upright on the front frame at a space interval at the rear of a fixation portion of the front frame and the thinned-cloth member; and a plate-shaped guide wall formed on an upper holder supporting an upper side of the thinned-cloth member, along a rear surface of an upper portion of the thinned-cloth member stretchedly developed. While the roof is closed, an upper portion of the thinned-cloth member is bent by a lower end of the guide wall which is configured to move forward as the guide wall comes down, a lower end side of the thinned-cloth member is stored between the fixation portion and the first upright wall, and an upper end side of the thinned-cloth member is stored between the first upright wall and the second upright wall. The guide wall is disposed in an upright position between the first upright wall and the second upright wall in storing.

According to the present invention, the lower portion of the thinned-cloth member is folded by the upper end of the first upright wall, and the upper portion of the thinned-cloth member is folded by the lower end of the guide wall. Thereby, the folded shape of the thinned-cloth member is stabilized.

In the present invention, a shape-stabilizing member for stabilizing a folded shape is stuck on the thinned-cloth member.

According to the present invention, the shape-stabilizing member exists to stabilize the folded shape of the thinned-cloth member of a flexible cloth, thereby further reducing variation in the folded shape.

Advantageous Effects of Invention

According to the present invention, the folded shape of the thinned-cloth member is stabilized without enlarging the storage space, and thereby the thinned-cloth member is prevented from being exposed to the interior.

BRIEF DESCRIPTION OF DRAWINGS

FIG. 2 is a side cross section view of the deflector;

FIG. 4 is an external perspective view of a deflector with a rubber member; and

DESCRIPTION OF EMBODIMENTS

Figure 1:
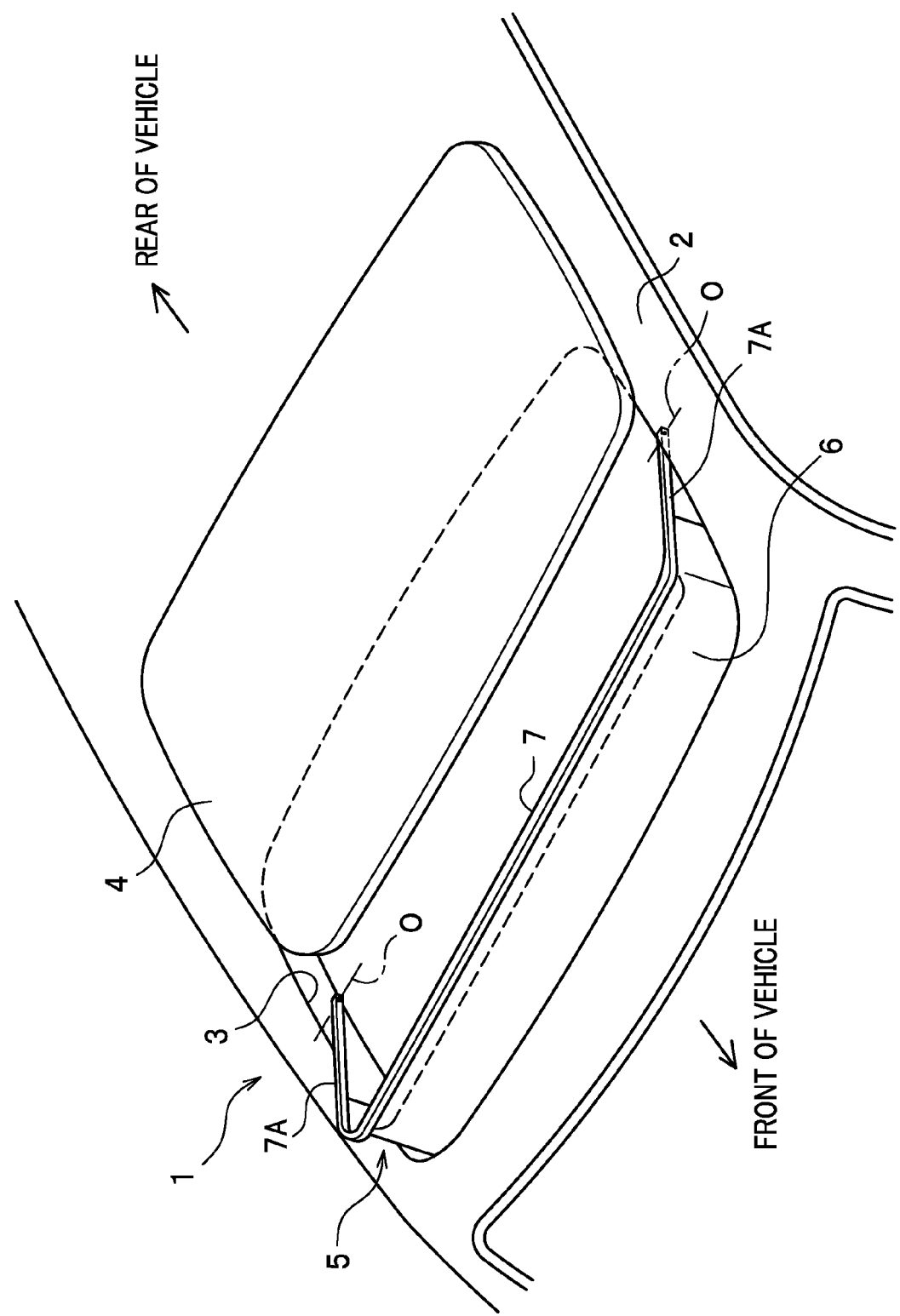
FIG. 1 is an external perspective view of a deflector.

In FIG. 1, a sunroof device 1 includes a roof panel 4 to open or close an approximately rectangular opening portion 3 formed on a fixation roof 2 of a vehicle body; and a deflector 5 disposed along the front edge of the opening portion 3 and projects upward from the fixation roof 2 when the roof panel 4 slides rearward to open the opening portion 3.

The deflector 5, as illustrated in FIG. 2, includes a thinned-cloth member 6; and an upper holder 7 and a lower holder 8 supporting the upper side and lower side of the thinned-cloth member 6 respectively. The thinned-cloth member 6 is formed of a net of a flexible cloth material and fine meshes. The upper edge and the lower edge of the thinned-cloth member 6 are each formed as a bag by sewing or the like as viewed in the side cross section. Respective core rods 9 and 10, inserted through the corresponding bag portions, are fittedly fixed in corresponding groove portions of the upper holder 7 and the lower holder 8 respectively. The upper holder 7 and the lower holder 8 are each formed of, for example, a resin material.

As illustrated in FIG. 1, the upper holder 7 is formed along the front edge of the opening portion 3, and has both ends formed as deflector arms 7A and 7A extending rearwardly. The deflector arm 7A has a rear end which is supported rotatably about the rotation axis O extending in a vehicle-width direction. The deflector arm 7A is attached with an elastic member (not illustrated) which always urges the upper holder 7 to rotate about the rotation axis O in an upward projecting direction.

The lower holder 8, illustrated in FIG. 2, is also formed along the front edge of the opening portion 3, and has both ends extending slightly rearward. The lower holder 8 is fixed on the front frame 11. The opening portion 3 has both the side edges below which side frames (not illustrated) are disposed, the side frames serving a guide function for sliding the roof panel 4, a supporting function for the deflector arms 7A, and a supporting function for the elastic member. The front frame 11 is formed of an elongated member in the vehicle-width direction so as to connect the front ends of both the side frames with each other, and is disposed below the front edge of the opening portion 3. The front frame 11 is formed of, for example, a resin material.

The front frame 11, as viewed in the side cross section, is composed of a shape including, in order from the front, a front end portion 11A which inclines slightly lower toward the front by following the fixation roof 2; a first bottom portion 11B formed after being bent downward from the rear end of the front end portion 11A; an approximately horizontal second bottom portion 11C disposed slightly below the first bottom portion 11B; an approximately horizontal rear end portion 11D formed after being bent upward from the rear end of the second bottom portion 11C. The lower holder 8 is supported on holder fixing projection portion 12 and 13 spaced from each other in the vehicle-width direction, and the supported lower holder 8 is fixed on the first bottom portion 11B. Namely, the lower side of the thinned-cloth member 6 is connected and fixed to the front frame 11 with the intervening lower holder 8.

As described above, while the roof panel 4 closes, press shoes (not illustrated) provided on the undersurface of the roof panel 4 press down the deflector arms 7A against the elastic members of urging force to move down the upper holder 7. This makes the thinned-cloth member 6 folded and stored above the front frame 11. When the front panel 4 opens and the deflector arms 7A are released from being pressed by the press shoes, the elastic members moves the upper holder 7 upward under urging force. Thereby, the thinned-cloth member 6 is stretched and developed to regulate a traveling air, thereby preventing a traveling air from flowing into the interior.

"Storage Guide Member 14"

The deflector structure of the invention includes a storage guide member 14 which guides the thinned-cloth member 6 for a folded motion. The storage guide member 14 includes a front-side first upright wall 15 and a rear-side second upright wall 16 each provided upright on the front frame 11 at the rear of a fixation portion of the front frame 11 and the thinned-cloth member 6, or the lower holder 8. The storage guide member 14 includes a guide wall 17 formed to the upper holder 7 along the rear face of the upper portion of the stretched and developed thinned-cloth member 6.

The first upright wall 15 extends in an approximately vehicle-width direction such that it inclines slightly forward from the middle, in the vehicle front-rear direction, of the second bottom portion 11C. The second upright wall 16 extends in an approximately vehicle-width direction of the vehicle such that it inclines slightly forward from the front side of the rear end portion 11D. The second upright wall 16 is formed more highly than the first upright wall 15. The first upright wall 15 and the second upright wall 16 are formed integrally with the front frame 11.

The guide wall 17 is a plate-shaped wall formed integrally to the upper holder 7 and extends in the approximately vehicle-width direction. As illustrated by the imaginary line of FIG. 2, while the thinned-cloth member 6 is stretched and developed, the guide wall 17 is disposed at the rear of the second upright wall 16. As illustrated by the solid line, while the thinned-cloth member 6 is stored, the guide wall 17 is disposed between the first upright wall 15 and the second upright wall 16. While rotating about the rotation axis O, the guide wall 17 moves forward as it comes down. The upper end of the guide wall 17 in storing is positioned approximately flush with the upper end of the second upright wall 16.

"Operation"

Figure 3A:
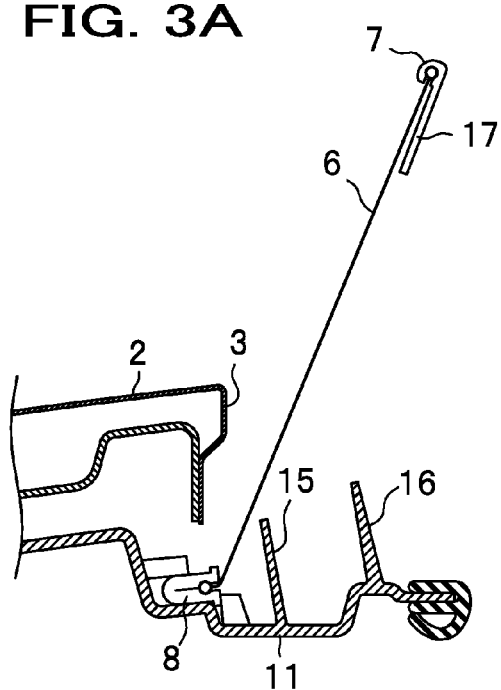
FIGS. 3A, 3B, 3C, and 3D are operation side cross section views of the deflector.

FIG. 3A illustrates that the thinned-cloth member 6 is stretched and developed and the guide wall 17 is disposed at the rear of the second upright wall 16. The thinned-cloth member 6 is provided upright in an inclined manner and stretchedly developed such that the upper side of it is displaced to the rear. The upper portion of the thinned-cloth member 6 is stretched approximately parallel to the guide wall 17.

Figure 3B:
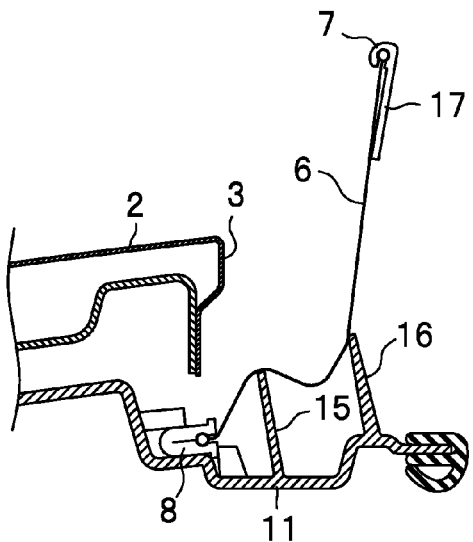
Figure 3C:
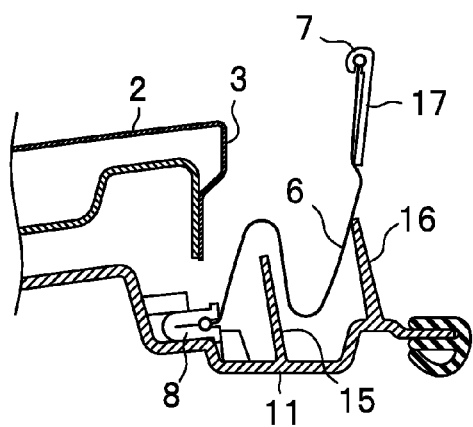

In FIG. 1, when the roof panel 4 closes and the press shoes push down the deflector arms 7A about the rotation axis O, the thinned-cloth member 6, as illustrated in FIGS. 3B and 3C, is folded by the upper end of the first upright wall 15 such that the lower portion of the thinned-cloth member 6 covers the first upright wall 15. The guide wall 17 positioned at the rear of the second upright wall 16 moves forward as it comes down. As illustrated in FIG. 3C, the upper portion of the thinned-cloth member 6 is given a trigger to be bent convexly rearward by the lower end of the guide wall 17.

Figure 3D:
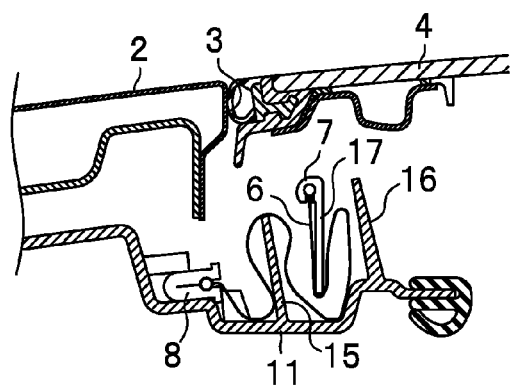
Figure 5A:
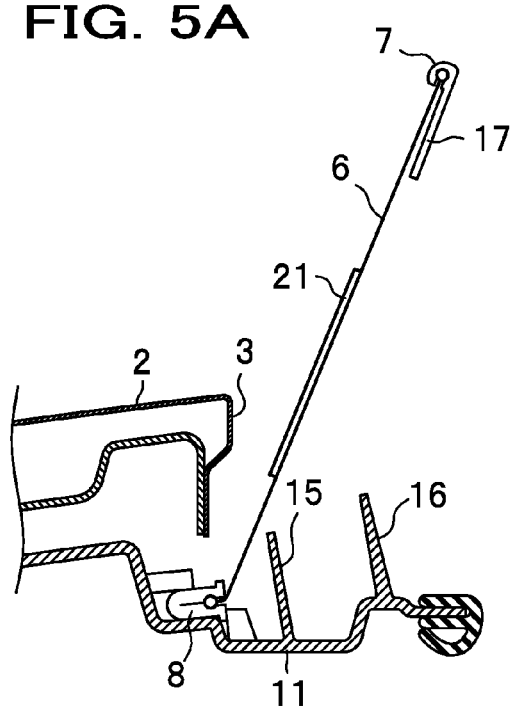
FIGS. 5A, 5B, 5C, and 5D are operation side cross section views of the deflector with the rubber member.
Figure 5B:
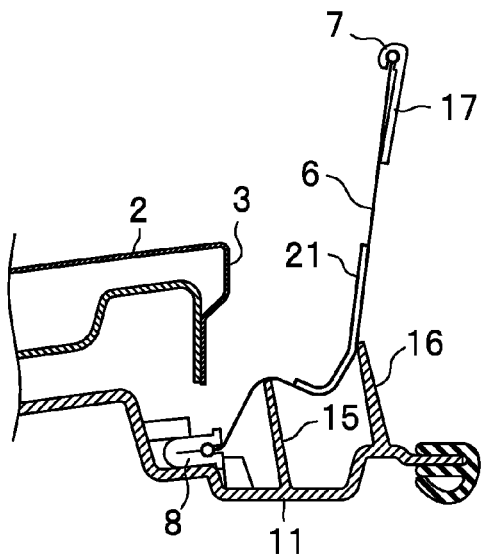
Figure 5C:
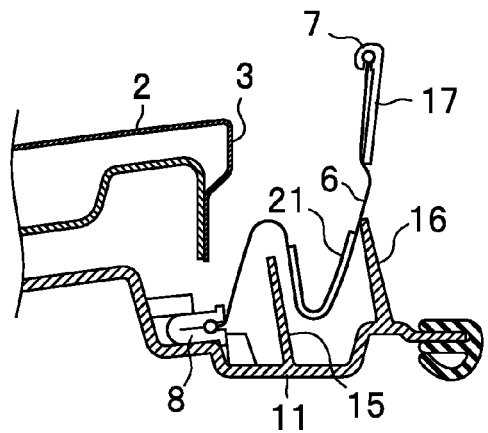
Figure 5D:
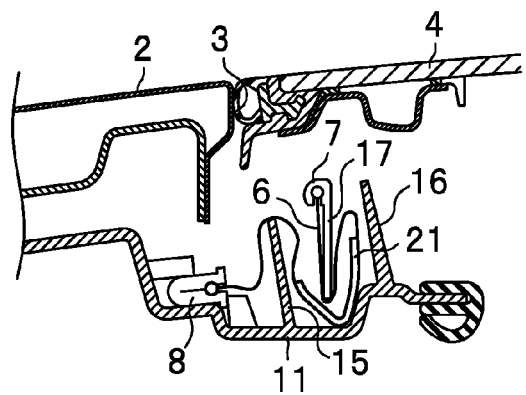

As illustrated in FIG. 3D, when the roof panel 4 completely closes, the guide wall 17 is positioned between the first upright wall 15 and the second upright wall 16, and the thinned-cloth member 6 is stored with it folded by the first upright wall 15 and the guide wall 17. The second upright wall 16 exists to prevent the thinned-cloth member 6 from projecting rearward of the second upright wall 16.

As described above, the front-side first upright wall 15 and the rear-side second upright wall 16 are provided upright on the front frame 11 at the rear of the fixation portion (the lower holder 8 in this embodiment) of the front frame 11 and the thinned-cloth member 6; and the guide wall 17 is formed to the upper holder 7 along the rear surface of the upper portion of the thinned-cloth member 6 stretched and developed. The guide wall 17 is disposed at the rear of the second upright wall 16 while the thinned-cloth member 6 is stretched and developed. The guide wall 17 is disposed between the first upright wall 15 and the second upright wall 16 while the thinned-cloth member 6 is stored. This disposal makes it possible to stabilize the folded shape of the thinned-cloth member 6. Therefore, the thinned-cloth member 6 does not need to ensure a large storage space, and is prevented from being exposed to the interior. The smaller the storage space for the thinned-cloth member 6 is made, the larger the opening dimension of the opening portion 3 of the sunroof device 1 is set.

FIGS. 4 and 5A to 5D illustrate a case in which shape-stabilizing members 21 for stabilizing the folded shape are stuck on the thinned-cloth member 6. The shape-stabilizing members 21 is each made of, for example, a rubber (gum) member. As illustrated in FIG. 4, the shape-stabilizing members 21 each formed as a vertical band are stuck so as to be spaced apart from each other in the vehicle-width direction. These shape-stabilizing members 21 exist to restrict the folding motion of the thinned-cloth member 6 of a flexible cloth. This restriction makes the folded shape stabilized, thereby further reducing variation in the folded shape of the thinned-cloth member 6.

REFERENCE SIGNS LIST

1 Sunroof device
2 Fixation roof
3 Opening portion
4 Roof panel
5 Deflector
6 Thinned-cloth member
7 Upper holder
8 Lower holder
11 Front frame
14 Storage guide member
15 First upright wall
16 Second upright wall
17 Guide wall
21 Shape-stabilizing member

The invention claimed is:

1. A deflector structure for a sunroof device comprising:
a thinned-cloth member having a lower side connectedly fixed to a front frame, the thinned-cloth member being configured to be stretchedly developed to regulate a traveling air while a roof is opened and be foldedly stored while the roof is closed; and
a storage guide member configured to guide folding motion of the thinned-cloth member,
the storage guide member comprising
a front-side first upright wall and a rear-side second upright wall provided upright on the front frame at a space interval at the rear of a fixation portion of the front frame and the thinned-cloth member; and
a plate-shaped guide wall formed on an upper holder supporting an upper side of the thinned-cloth member, along a rear surface of an upper portion of the thinned-cloth member stretchedly developed,
wherein while the roof is closed,
an upper portion of the thinned-cloth member is bent by a lower end of the guide wall which is configured to move forward as the guide wall comes down,
a lower end side of the thinned-cloth member is stored between the fixation portion and the first upright wall, and an upper end side of the thinned-cloth member is stored between the first upright wall and the second upright wall, and
wherein the guide wall is disposed in an upright position between the first upright wall and the second upright wall in storing.

2. The deflector structure for a sunroof device according to claim 1,
wherein a shape-stabilizing member for stabilizing a folded shape is stuck on the thinned-cloth member.

* * * * *